United States Patent
Niwa et al.

(10) Patent No.: US 10,628,143 B2
(45) Date of Patent: Apr. 21, 2020

(54) PROGRAM DEVELOPMENT ASSIST SYSTEM, PROGRAM DEVELOPMENT ASSIST METHOD, AND NON-TRANSITORY COMPUTER READABLE RECORDING MEDIUM

(71) Applicant: OMRON Corporation, Kyoto (JP)

(72) Inventors: Yoshimi Niwa, Kyoto (JP); Taku Oya, Kyoto (JP); Kei Yasuda, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/275,350

(22) Filed: Feb. 14, 2019

(65) Prior Publication Data

US 2019/0286425 A1    Sep. 19, 2019

(30) Foreign Application Priority Data

Mar. 15, 2018 (JP) ................... 2018-048453

(51) Int. Cl.
*G06F 9/44* (2018.01)
*G06F 8/41* (2018.01)
(Continued)

(52) U.S. Cl.
CPC .......... *G06F 8/47* (2013.01); *G05B 19/0426* (2013.01); *G06F 8/33* (2013.01); *G06F 8/34* (2013.01);
(Continued)

(58) Field of Classification Search
CPC . G06F 8/447; G06F 8/45; G06F 8/458; G06F 9/3851; G06F 8/47; H04L 12/28; G05B 19/0426
See application file for complete search history.

(56) References Cited

U.S. PATENT DOCUMENTS

| 7,143,366 B1 | 11/2006 | McKelvey et al. |
| 2008/0256330 A1* | 10/2008 | Wang ............ G06F 8/447 712/24 |

(Continued)

FOREIGN PATENT DOCUMENTS

| JP | 2003241997 | 8/2003 |
| JP | 2008-276526 | 11/2008 |

(Continued)

OTHER PUBLICATIONS

Mary W. Hall et al., "Experiences Using the ParaScope Editor: an Interactive Parallel Programming Tool," ACM SIGPLAN Notices, vol. 28 Issue 7, Jul. 1993, pp. 33-43.

(Continued)

*Primary Examiner* — Tuan A Vu
(74) *Attorney, Agent, or Firm* — JCIPRNET

(57) ABSTRACT

Provided is a program development assist system, a program development assist method, and a non-transitory computer readable recording medium storing a program development assist program. The program development assist system includes: a shared variable extraction part that extracts, from the first source code that is described in the first programming language, shared variables that are variables shared by the first source code and the second source code that is described in the second programming language in a memory; and a display control part that causes a development screen of the second source code to display information indicating shared variables that are extracted by the shared variable extraction part.

11 Claims, 13 Drawing Sheets

(51) Int. Cl.
*G06F 8/34* (2018.01)
*G06F 8/33* (2018.01)
*G05B 19/042* (2006.01)
*G06F 9/38* (2018.01)
*G05B 19/05* (2006.01)

(52) U.S. Cl.
CPC .............. *G06F 9/3851* (2013.01); *G06F 9/44* (2013.01); *G05B 19/056* (2013.01); *G05B 2219/15118* (2013.01)

(56) References Cited

U.S. PATENT DOCUMENTS

| | | | | |
|---|---|---|---|---|
| 2010/0275190 | A1* | 10/2010 | Ishizaki | G06F 8/458 |
| | | | | 717/149 |
| 2012/0110559 | A1* | 5/2012 | Dolinsky | G06F 8/45 |
| | | | | 717/143 |
| 2019/0286423 | A1* | 9/2019 | Maruno | G05B 19/0426 |
| 2019/0369588 | A1* | 12/2019 | Amano | H04L 12/28 |

FOREIGN PATENT DOCUMENTS

| | | |
|---|---|---|
| JP | 2009-140028 | 6/2009 |
| JP | 2012-164178 | 8/2012 |
| JP | 2016-192172 | 11/2016 |

OTHER PUBLICATIONS

"Search Report of Europe Counterpart Application," dated Oct. 4, 2019, pp. 1-9.

\* cited by examiner

```
// Declaration of shared variables
SGLOBAL BOOL reqHandClose

// Movement of arm
APPRO pickWork.loc, 50
SPEED 10
MOVES pickWork.loc
BREAK reqHandClose=TRUE // Wait for completion of operation of end effector
WHILE reqHandClose DO
END // Movement of arm
DEPART 50
MOVES waitPlace.loc
```

FIG. 2

| Name | Data type | ... | Variable sharing | ... | ... | ... | Comment | ... |
|---|---|---|---|---|---|---|---|---|
| reqHandClose | BOOL | ... | Applied | ... | ... | ... | ... | ... |
| ... | ... | ... | ... | ... | ... | ... | ... | ... |

FIG. 3

```
// Operation of end effector
IF reqHandClose=TRUE THEN
  HandControlEx:=TRUE;
  HandControlDist:=40
    IF HandControlDone=TRUE THEN
      reqHandClose:=FALSE;
    END_IF
END_IF //MC_MoveRelative
HandControl(
   Axis:=MC_Axis000,
   Execute:=HandControlEx
   Distance:=HandControlDist,
   Velocity:=100,
   Acceleration:=10000,
   Deceleration:=10000,
   Done =>HandControlDone
      );
```

FIG. 4

| Name | Data type | ... | Variable sharing | ... | ... | ... | ... | Comment | ... |
|---|---|---|---|---|---|---|---|---|---|
| reqHandClose | BOOL | ... | Applied | ... | ... | ... | ... | ... | ... |
| ... | ... | ... | ... | ... | ... | ... | ... | ... | ... |

```
// Operation of end effector
IF reqHandClose= TRUE THEN
  HandControlEx:= TRUE;
  HandControlDist:= 40
  IF HandControlDone= TRUE THEN
    reqHandClose:= FALSE;
  END_IF
END_IF //MC_MoveRelative
HandControl(
  Axis := MC_Axis000,
  Execute := HandControlEx
  Distance := HandControlDist,
  Velocity := 100,
  Acceleration := 10000,
  Deceleration := 10000,
  Done => HandControlDone
);
```

FIG. 5

| Name | Data type | ... | Variable sharing | ... | ... | ... | Comment | ... |
|---|---|---|---|---|---|---|---|---|
| reqHandClose | BOOL | ... | Applied | ... | ... | ... | ... | ... |
| ... | ... | ... | ... | ... | ... | ... | ... | ... |

```
// Declaration of shared variable
SGLOBAL BOOL reqHandClose

// Movement of arm
APPRO pickWork.loc, 50
SPEED 10
MOVES pickWork.loc
BREAK reqHandClose= TRUE // Wait for completion of operation of end effector
WHILE reqHandClose DO
END // Movement of arm
DEPART 50
MOVES waitPlace.loc
```

```
// Operation of end effector
IF reqHandClose= TRUE THEN
  HandControlEx:= TRUE;
  HandControlDist:= 40
  IF HandControlDone= TRUE THEN
    reqHandClose:= FALSE;
  END_IF
END_IF //MC_MoveRelative
HandControl(
  Axis     := MC_Axis000,
  Execute  := HandControlEx
  Distance := HandControlDist,
  Velocity := 100,
  Acceleration := 10000,
  Deceleration := 10000,
  Done => HandControlDone
);
```

| Name | Data type | ... | Variable sharing | ... | ... | ... | Comment | ... |
|---|---|---|---|---|---|---|---|---|
| reqHandClose | BOOL | ... | Applied | ... | ... | ... | ... | ... |
| ... | ... | ... | ... | ... | ... | ... | ... | ... |

| Name | Data type | ... | Variable sharing | ... | ... | ... | ... | Comment | ... |
|---|---|---|---|---|---|---|---|---|---|
| startHandClose | BOOL | ... | Applied | ... | ... | ... | ... | ... | ... |
| ... | ... | ... | ... | ... | ... | ... | ... | ... | ... |

FIG. 8

```
// Operation of end effector
IF startHandClose=TRUE THEN
HandControlEx:=TRUE;
HandControlDist:=40
   IF HandControlDone=TRUE THEN
      startHandClose:=FALSE;
   END_IF
END_IF //MC_MoveRelative
HandControl(
   Axis:=MC_Axis000,
   Execute:=HandControlEx
   Distance:=HandControlDist,
   Velocity:=100,
   Acceleration:=10000,
   Deceleration:=10000,
   Done=>HandControlDone
      );
```

FIG. 9

| Build window | | | |
|---|---|---|---|
| ⊗ 1 Error | ⚠ 0 Warning | | |
| | Outline | Program | Occurrence location |
| ⊗ | 1 | This is name of variable that has not been defined as global resistance | Variable table | reqHandClose・Name |

FIG. 10

PROGRAM DEVELOPMENT ASSIST SYSTEM, PROGRAM DEVELOPMENT ASSIST METHOD, AND NON-TRANSITORY COMPUTER READABLE RECORDING MEDIUM

CROSS-REFERENCE TO RELATED APPLICATION

This application claims the priority of Japan patent application serial no. 2018-048453, filed on Mar. 15, 2018. The entirety of the above-mentioned patent application is hereby incorporated by reference herein and made a part of this specification.

BACKGROUND

Technical Field

The disclosure relates to a program development assist system, a program development assist method, and a program development assist program.

Description of Related Art

A controller such as a programmable logic controller (PLC) executes synchronous control between robot control for controlling operations of a robot and sequence control for controlling operations of a device such as an end effector in some cases. Source codes of a program for the robot control and source codes of a program for the sequence control are described in different programming languages. For example, the source codes of the program for the robot control are described using an interpreter-type language in some cases. The source codes of the program for the sequence control are described using IEC61131-3 that is one of compiler-type languages provided by the International Electrotechnical Commission (IEC) in some cases.

A program development assist system that assists with development of a program provides a development environment for creating source codes in different programming languages. Also, the program development assist system generates an execution file by executing build processing on source codes that are described in a compiler-type language. A controller that is placed in a factory or the like executes synchronous control of robot control and sequence control on the basis of source codes in an interpreter-type language and the generated execution file.

PATENT DOCUMENTS

[Patent Document 1] Japanese Laid-Open No. 2016-192172
[Patent Document 2] Japanese Laid-Open No. 2008-276526
[Patent Document 3] Japanese Laid-Open No. 2012-164178
[Patent Document 4] Japanese Laid-Open No. 2009-140028

In this manner, the same variables are shared between source codes that are described in different programming languages in some cases. Hereinafter, such variables will be referred to as "shared variables." In a case in which the source codes that are described in different programming languages are created by mutually different creators, for example, in some cases, the creators of the respective source codes cannot efficiently recognize shared variables that are used in the source codes that use other programming languages. As a result, failures occur in description of the shared variables and proper implementation cannot be realized between the source codes that are described in the different programming languages.

Such circumstances in relation to the shared variables are not unique to development of programs for robot control and sequence control in the PLC. Such circumstances in relation to shared variables are common in a case in which the source codes (for example, a first source code and a second source code) that are described in different programming languages (for example, a first programming language and a second programming language) are created.

SUMMARY

According to an aspect of the disclosure, there is provided a program development assist system including: a shared variable extraction part that extracts, from a first source code that is described in a first programming language, shared variables that are variables shared by the first source code and a second source code that is described in a second programming language in a memory; and a display control part that causes a development screen of the second source code to display information indicating the shared variables extracted by the shared variable extraction part.

According to an aspect of the disclosure, there is provided a program development assist method that is executed by an information processing apparatus, the method including: extracting, from a first source code that is described in a first programming language, shared variables that are variables shared by the first source code and a second source code that is described in a second programming language in a memory; and causing a development screen of the second source code to display information indicating the extracted shared variables.

According to an aspect of the disclosure, there is provided a program development assist program that causes a computer to execute: a procedure of extracting, from a first source code that is described in a first programming language, shared variables that are variables shared by the first source code and a second source code that is described in a second programming language in a memory; and a procedure of causing a development screen of the second source code to display information indicating the extracted shared variables.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a diagram illustrating an example of a first source code.

FIG. 3 is a diagram illustrating a first example of a global variable table.

FIG. 4 is a diagram illustrating a first example of a second source code.

FIG. 5 is a first example of display of the global variable table.

FIG. 6 is a second example of display of the global variable table.

FIG. 7 is a third example of display of the global variable table.

FIG. 8 is a diagram illustrating a second example of the global variable table.

FIG. 9 is a diagram illustrating a second example of the second source code.

FIG. 10 is a diagram illustrating an alarm output example.

DESCRIPTION OF THE EMBODIMENTS

The disclosure provides a program development assist system, a program development assist method, and a program development assist program that enable a creator of a second source code that is described in a second programming language to efficiently recognize shared variables that are declared in a first source code that is described in a first programming language.

According to an embodiment of the disclosure of the disclosure, the display control part causes the development screen of the second source code to display the second source code and information indicating the shared variables, in the aforementioned program development assist system.

According to an embodiment of the disclosure of the disclosure, the display control part causes the development screen of the second source code to display the first source code, in the aforementioned program development assist system.

According to an embodiment of the disclosure of the disclosure, the aforementioned program development assist system further includes: a registration part that registers information indicating the shared variables in a data table, and the display control part causes the development screen of the second source code to display the data table.

According to an embodiment of the disclosure of the disclosure, the registration part registers the information indicating the unregistered shared variables in the data table in a case in which information indicating any of the shared variables extracted from the first source code has not been registered in the data table, in the aforementioned program development assist system.

The disclosure enables a creator of the second source code that is described in the second programming language to efficiently recognize the shared variables declared in the first source code that is described in the first programming language.

An embodiment of the disclosure will be described in detail with reference to the drawings.

Figure 1:
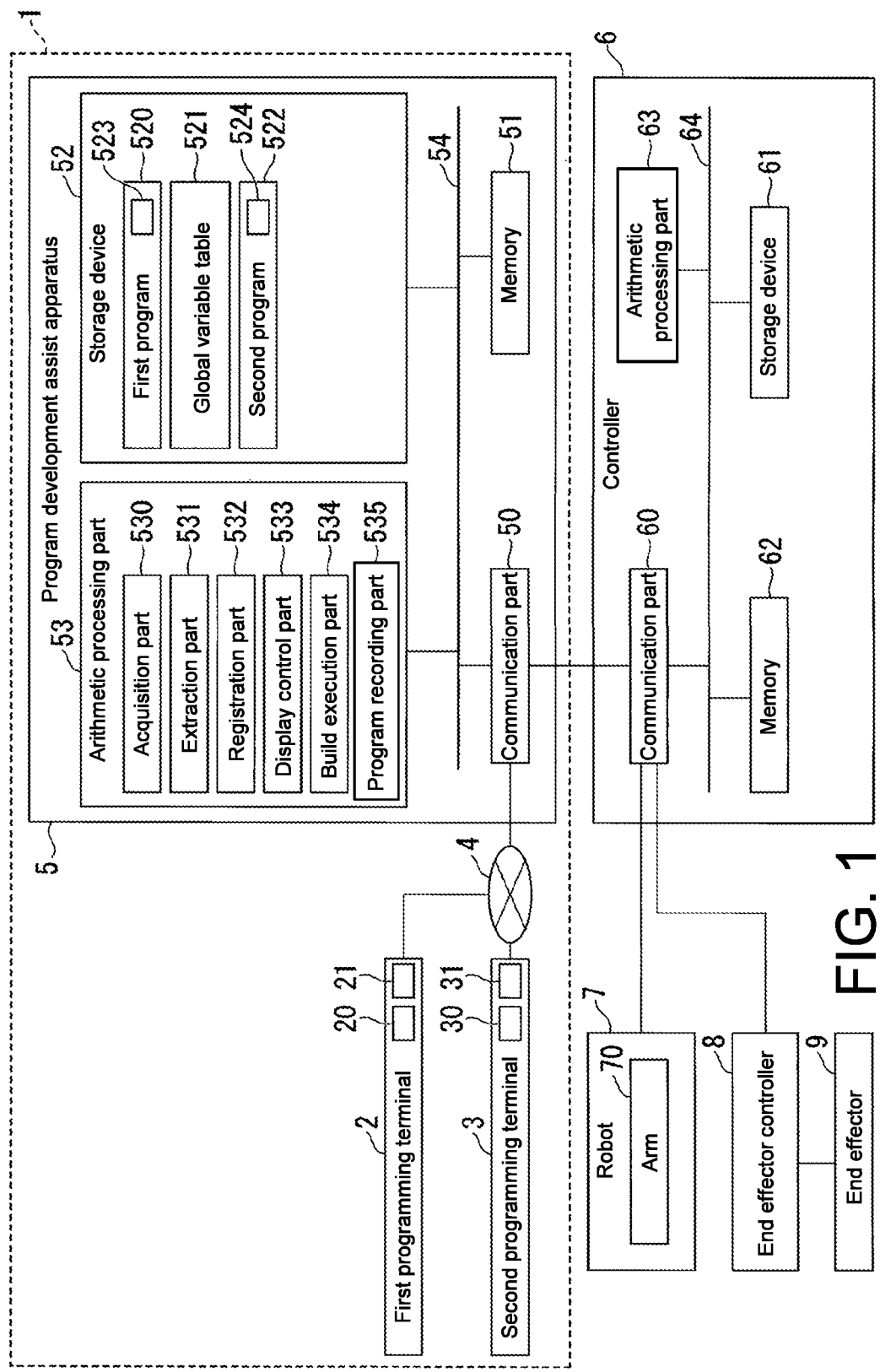
FIG. 1 is a diagram illustrating a configuration example of a program development assist system.

FIG. 1 is a diagram illustrating a configuration example of a program development assist system 1. The program development assist system 1 is a system that assists with development of a first program that includes one or more first source codes that are described in a first programming language and a second program that includes one or more second source codes that are described in a second programming language. As the first programming language, an interpreter-type language that is used to develop a program for robot control is exemplified. Specific examples of the second programming language include IEC61131-3 that is one compiler-type language and is used to develop a program for sequence control.

The program development assist system 1 includes a first programming terminal 2, a second programming terminal 3, a communication line 4, and a programming development assist apparatus 5. The program development assist system 1 can communicate with a controller 6. The controller 6 can communicate with a robot 7, an end effector controller 8, and an end effector 9.

The first programming terminal 2 is an information processing apparatus such as a personal computer. The first programming terminal 2 is used by a user to develop the first program. The first programming terminal 2 communicates with the programming development assist apparatus 5 via the communication line 4 such as a local area network (LAN).

The first programming terminal 2 includes a display part 20 and an input part 21. The display part 20 is an image display device such as a cathode ray tube (CRT) display, a liquid crystal display, or an organic electro luminescence (EL) display. The display part 20 displays an image of a development screen of the first source codes as one development environment of the first source codes. The input part 21 is configured using an existing input device such as a keyboard, a pointing device (such as a mouse or a tablet), a button, or a touch panel. The input part 21 is operated by the user when a user's instruction is input to the first programming terminal 2.

The first programming terminal 2 receives data indicating the development screen of the first source codes from the programming development assist apparatus 5. The first programming terminal 2 causes the display part 20 to display the received development screen. The person who develops the first program creates the first source codes by operating the input part 21 while referring to the development screen. The first source codes created via the first programming terminal 2 are saved in the programming development assist apparatus 5.

The second programming terminal 3 is an information processing apparatus such as a personal computer. The second programming terminal 3 is used by a user to develop a second program that is represented by second source codes that are described in the second programming language. The second programming terminal 3 communicates with the programming development assist apparatus 5 via the communication line 4. The second programming terminal 3 includes a display part 30 and an input part 31. The display part 30 is an image display device such as a CRT display, a liquid crystal display, or an organic EL display. The display part 30 displays an image of the development screen of the second source codes as one development environment of the second source codes. The input part 31 is configured using an existing input device such as a keyboard, a pointing device, a button, or a touch panel. The input part 31 is operated by the user when a user's instruction is input to the second programming terminal 3.

The second programming terminal 3 receives data indicating the development screen of the second source codes from the programming development assist apparatus 5. The second programming terminal 3 causes the display part 30 to display the received development screen. The person who develops the second program creates the second source codes by operating the input part 31 while referring to the development screen. The second source codes created via the second programming terminal 3 are saved in the programming development assist apparatus 5.

The programming development assist apparatus 5 is an information processing apparatus such as a personal computer or a server. The programming development assist apparatus 5 assists with development of the first source codes by causing the display part 20 of the first programming terminal 2 to display the development screen of the first source codes. The programming development assist apparatus 5 assists with development of the second source codes by causing the display part 30 of the second programming terminal 3 to display the development screen of the second source codes. The programming development assist apparatus 5 saves the second source codes created via the second programming terminal 3 and generates an execution file for causing the controller 6 to operate. Hereinafter, details of the programming development assist apparatus 5 will be described.

The programming development assist apparatus 5 includes a communication part 50, a memory 51, a storage device 52, an arithmetic processing part 53, and a bus 54. The communication part 50, the memory 51, the storage device 52, and the arithmetic processing part 53 are connected to each other by the bus 54 such that they can communicate with each other.

The communication part 50 is a communication interface. The communication part 50 communicates with the first programming terminal 2, the second programming terminal 3, and the controller 6 on the basis of a predetermined communication protocol.

The memory 51 is a volatile recording medium such as a random access memory (RAM). The memory 51 stores a program that is executed by the arithmetic processing part 53.

The storage device 52 is a storage device such as a magnetic hard disk device or a semiconductor storage device. It is desirable that the storage device 52 be a non-volatile storage device. The storage device 52 stores a first program 520, a global variable table 521, and a second program 522. In a case in which a plurality of projects have been developed, the storage device 52 stores the entire projects of the first program 520, the global variable table 521, and the second program 522. In this case, the first program 520, the global variable table 521, and the second program 522 may be stored as project files.

The first program 520 is a program for robot control of controlling operations of the robot 7. The first program 520 is configured of one or more first source codes 523.

The global variable table 521 is a data table that has information related to global variables. The global variable table 521 has one or a plurality of global variable records. The global variable records have information related to global variables declared in the first program 520. The respective global variable records have values such as names, data types, variable sharing, and comments. The names indicate character sequences of names of the global variables. The data types indicate data types of values of the global variables. The variable sharing indicates whether or not the global variables are shared between source codes in different programming languages. The variable sharing will be described in detail.

The global variables according to the embodiment include shared global variables that are used as shared variables and non-shared global variables that are not used as shared variables. The shared global variables are specific examples of the shared variables. In a case in which variable sharing is "applied," the global variables indicated by the global variable records thereof are shared global variables. The shared global variables are shared between the first source codes 523 of the first program 520 and the second source codes 524 of the second program 522. For example, in a case in which the variable sharing is "applied," the global variables indicated by the global variable records thereof can be used even if the global variables have not been declared in source codes of other programs as long as the global variables have been declared in either the first source codes 523 of the first program 520 or the second source code 524 of the second program 522, and it is possible to refer to or change substituted values. Meanwhile, in a case in which the variable sharing is "not applied," the global variables indicated by the global variable records thereof are non-shared global variables.

The second program 522 is a program for sequence control of controlling operations of the end effector 9. The second program 522 is configured of one or more second source codes 524. The second source codes 524 are converted into execution files (binary files) by build processing being executed on the second source codes 524 before execution of the second program 522.

The arithmetic processing part 53 is configured using a processor such as a central processing unit (CPU). The arithmetic processing part 53 executes a program that is stored in advance in a non-volatile storage device of the programming development assist apparatus 5 by developing the program in the memory 51. The arithmetic processing part 53 functions as an acquisition part 530, an extraction part 531 (shared variable extraction part), a registration part 532, a display control part 533, a build execution part 534, and a program recording part 535 by executing the program. Hereinafter, the respective functions will be described.

The acquisition part 530 acquires the first source codes 523 of the first program 520 from the storage device 52. The acquisition part 530 acquires the second source codes 524 of the second program 522 from the storage device 52.

The extraction part 531 extracts the global variables from the first source codes 523. The extraction part 531 functions as a function part (shared variable extraction part) that extracts the shared global variables. The extraction part 531 extracts the shared global variables by searching for a predefined character sequence indicating the shared global variables in the first source codes 523, for example. Specific examples of the predefined character sequence indicating the shared global variables include a character sequence "SGLOBAL." Also, the extraction part 531 extracts the non-shared global variables from the first source codes 523. The extraction part 531 extracts the non-shared global variables by searching for a predefined character sequence indicating the non-shared global variables in the first source codes 523, for example. Specific examples of the predefined character sequence indicating the non-shared global variables include a character sequence "GLOBAL."

The processing of the extraction part 531 is executed at a predetermined timing. The predetermined timing may be a specific time cycle such as a cycle of 30 minutes or a cycle of 1 hour, for example. The predetermined timing may be a timing at which a command for updating the global variable table 521 is acquired from the first programming terminal 2 or the second programming terminal 3. The predetermined timing may be a timing at which the build execution part 534 executes the build processing. The timing at which the extraction is performed is not limited to the aforementioned examples.

The registration part 532 registers the information indicating the global variables extracted from the first source codes 523 in the global variable table 521. For example, the registration part 532 may generate global variable records on the basis of the extracted character sequence and data types of the global variables and register the generated global variable records in the global variable table 521. The display control part 533 outputs a project file stored in the storage device 52 to the first programming terminal 2 in response to a request from the first programming terminal 2. In this manner, the display part 20 of the first programming terminal 2 can display the project file such as the first source codes 523 and the global variable table 521.

In a case in which the extraction part 531 executes processing of extracting the global variables from the first source codes 523, the registration part 532 determines whether or not all the shared variables extracted from the first source codes 523 have been registered as shared variables in the global variable table 521. In a case in which the shared variables extracted from the first source codes 523 have not been registered as shared variables in the global variable table 521, the registration part 532 registers information indicating the unregistered shared variables in the global variable table 521.

The registration part 532 further determines whether or not all the global variables registered as shared variables in the global variable table 521 have been extracted from the first source codes 523. In a case in which global variables that have been registered as shared variables in the global variable table 521 but have not been extracted from the first source codes 523 are present, information related to the corresponding global variables is output along with an alarm instruction to the display control part 533.

The display control part 533 outputs the project file stored in the storage device 52 to the second programming terminal 3 in response to a request from the second programming terminal 3. In this manner, the display part 30 of the second programming terminal 3 can display the project file such as the second source codes 524 and the global variable table 521. Also, in a case in which the alarm instruction is received from the registration part 532, the display control part 533 outputs information related to global variables corresponding to the alarm and an alarm message to the first programming terminal 2 and the second programming terminal 3.

In a case in which all the shared variables declared in the first source codes 523 have been registered as shared variables in the global variable table 521, the build execution part 534 generates an execution file by executing build processing on the second source codes 524 of the second program 522.

The program recording part 535 records the first program 520 acquired from the first programming terminal 2 by the communication part 50 in the storage device 52. The program recording part 535 records the second program 522 acquired from the second programming terminal 3 by the communication part 50 in the storage device 52.

Next, details of the processing performed by the programming development assist apparatus 5 will be described using a specific example.

FIG. 2 is a diagram illustrating an example of the first source codes 523. In FIG. 2, the character sequence "SGLOBAL," the character sequence "BOOL" indicating that a data type of a variable is a Boolean type, and the character sequence "reqHandClose" indicating the name of a variable are described in the first source codes 523. The character sequence "SGLOBAL" is a character sequence indicating that the declared global variable is a shared variable. The shared variable "reqHandClose" is a global variable for requesting the end effector 9 to grasp a workpiece in one example. In FIG. 2, the extraction part 531 extracts the shared variable "reqHandClose" declared in the character sequence "SGLOBAL" from the first source codes 523.

FIG. 3 is a diagram illustrating a first example of the global variable table 521. The global variable table 521 illustrated in FIG. 3 is an example of the global variable table 521 in a case in which the shared variable "reqHandClose" has been declared in the first program 520. In FIG. 3, the registration part 532 registers the name "reqHandClose" indicating a shared variable, a data type "BOOL," and the like as information indicating the shared variable in the global variable table 521.

The registration part 532 registers "applied" in the section of the variable sharing in the global variable table 521 in an associated manner with the global variable that is a shared variable that has been declared in the description of the character sequence "SGLOBAL." The registration part 532 registers "not applied" in the section of the variable sharing in the global variable table 521 in an associated manner with the global variable that is a non-shared variable that has been declared in the description of the predefined character sequence such as "GLOBAL."

Note that in a case in which a shared variable that has not been extracted from the first source codes 523 has been registered as a shared variable in the global variable table 521, the registration part 532 may register "not applied" in the section of the variable sharing associated with the shared variable that has not been extracted in the global variable table 521.

FIG. 4 is a diagram illustrating a first example of the second source codes 524. In FIG. 4, the shared variable "reqHandClose" declared in the first source codes 523 has been used by the second source codes 524. The location with description of "IF reqHandClose=TRUE THEN" corresponds to processing of waiting for a notification from a task of the first program 520 in a task of the second program 522. The location with description of "reqHandClose:=false;" corresponds to processing of outputting a notification to the task of the first program 520 in the task of the second program 522.

Note that the second program 522 can use the shared variable "reqHandClose" that has not been declared again in the second source codes 524 by the arithmetic processing part 53 executing build processing of associating an include file that includes the shared variable "reqHandClose" with the second source codes 524. The include file is generated by the global variable table 521 being converted into a text format, for example.

FIG. 5 is a first example of display of the global variable table 521. The second source codes 524 and the global variable table 521 are displayed in line on the development screen of the second source codes 524 on the display part 30 of the second programming terminal 3. The scroll bar 600 is an operation image for scrolling the global variable table 521. The person who develops the second program 522 checks the shared variables that have been declared in the first source codes 523 in the global variable table 521 displayed on the display part 30. In FIG. 5, the person who develops the second program 522 can check a list of the shared variables that have been declared in the first source codes 523 in the global variable table 521 and then add the shared variable "redHandClose" to the second source codes 524.

FIG. 6 is a second example of display of the global variable table 521. The first source code 523, the second source code 524, and the global variable table 521 may be displayed in line on the development screen of the second source codes 524 on the display part 30.

FIG. 7 is a third example of display of the global variable table 521. The global variable table 521 may be displayed on the entire development screen of the second source codes 524 on the display part 30.

Next, a case in which there is a failure in description of shared variables will be described.

FIG. 8 is a diagram illustrating a second example of the global variable table 521. The global variable table 521 illustrated in FIG. 8 is an example of the global variable table 521 in a case in which the shared variable "startHandClose" rather than the shared variable "reqHandClose" has been declared in the first source codes 523 of the first program 520.

FIG. 9 is a diagram illustrating a second example of the second source codes 524. In FIG. 9, the person who develops the second program 522 adds the shared variable "startHandClose" to the second source codes 524 on the basis of the global variable table 521 in FIG. 8 that is displayed on the display part 30.

In a case in which the person who develops the first program 520 erroneously rewrites the shared variable "startHandClose" with "reqHandClose" in the first source codes 523 after the shared variable "startHandClose" is added to the second source codes 524, the first program 520 refers to the shared variable "reqHandClose", and the second program 522 refers to the shared variable "startHandClose". Therefore, the second source code 524 of the second program 522 cannot share the shared variable "reqHandClose" that has been declared in the first source codes 523 in the memory. In a case in which the first source codes 523 of the first program 520 and the second source codes 524 of the second program 522 cannot share the shared variable in the memory, the controller 6 cannot execute synchronous control of robot control and sequence control. In order to prevent the controller 6 from being not able to execute the synchronous control, the programming development assist apparatus 5 executes processing of checking whether or not the shared variable has not been registered in the global variable table 521 at a predetermined cycle, and in a case in which there is a failure in description of the shared variable, it is necessary to output an alarm to the first programming terminal 2 and the second programming terminal 3.

Note that the person who develops the first program 520 can rewrite the global variable table 521 illustrated in FIG. 3 through a manual operation via the first programming terminal 2 and the registration part 532. Even in a case in which the person who develops the first program 520 erroneously registers the shared variable "startHandClose" as illustrated in FIG. 8 in the global variable table 521 illustrated in FIG. 3 regardless of the fact that the shared variable "reqHandClose" has already been declared in the first source codes 523 illustrated in FIG. 2, it is necessary for the programming development assist apparatus 5 to output an alarm to the first programming terminal 2 and the second programming terminal 3 for the fact that the shared variable "startHandClose" has not been declared in the first source codes 523.

FIG. 10 is a diagram illustrating an output example of an alarm. The registration part 532 acquires the global variable table 521 from the storage device 52. The registration part 532 acquires the first source code 523 and the second source code 524 from the storage device 52. The registration part 532 determines whether or not all the global variables that have been registered as shared variables in the global variable table 521 have been declared in the first source codes 523.

In a case in which global variables that have not been extracted from the first source codes 523 are present regardless of the fact that the global variables have been registered as shared variables in the global variable table 521, the display control part 533 outputs an alarm to the first programming terminal 2 and the second programming terminal 3.

The shared variable "reqHandClose" of the first source codes 523 in FIG. 2 has not been registered in the global variable table 521 in FIG. 8. In this case, the display control part 533 outputs an alarm indicating that the shared variable "reqHandClose" of the first source codes 523 has not been registered in the global variable table 521 to the first programming terminal 2 and the second programming terminal 3.

The display control part 533 outputs "This is a name of a variable that has not been defined as a global variable" that indicates an outline of an error, a "variable table" indicating that the error is on the basis of the global variable table 521, and "reqHandClose, name" indicating an error occurring location to the first programming terminal 2 and the second programming terminal 3.

The controller 6 is a controller such as a PLC. The controller 6 includes a communication part 60, a storage device 61, a memory 62, an arithmetic processing part 63, and a bus 64 that transfers data in the controller 6.

The communication part 60 communicates with the programming development assist apparatus 5. The communication part 60 records the first source codes 523 of the first program 520 acquired from the programming development assist apparatus 5 in the storage device 61. The communication part 60 records the execution file acquired from the programming development assist apparatus 5 in the storage device 61. The communication part 60 communicates with the robot 7 and the end effector controller 8 on the basis of a communication protocol such as EtherCAT (registered trademark). The communication part 60 transmits control signals to the robot 7 and the end effector controller 8 in accordance with synchronous control performed by the arithmetic processing part 63.

The storage device 61 is a non-volatile recording medium (non-transitory recording medium) such as a flash memory or a hard disk drive. The storage device 61 stores the first source codes 523 and the execution file acquired from the programming development assist apparatus 5. The first source code 523 and the execution file are developed in the memory 62 from the storage device 61 when the programming development assist apparatus 5 is activated.

The memory 62 is a volatile recording medium such as a RAM. The shared variable is shared between the first source code 523 of the first program 520 and the second source code 524 of the second program 522 in the memory 62.

The arithmetic processing part 63 controls operations of the robot 7 by successively executing the first source codes 523 of the first program 520. The arithmetic processing part 63 controls operations of the end effector 9 on the basis of the execution file of the second program 522. The arithmetic processing part 63 acquires the execution file of the second program 522 from the memory 62 and executes the execution file of the second program 522.

The arithmetic processing part 63 executes the first program 520 and the second program 522 in mutually different tasks. In a case in which flag processing "reqHandClose=TRUE" of the first source codes 523 illustrated in FIG. 2 is executed, the arithmetic processing part 63 changes the value of the shared variable "reqHandClose" in the memory 62 to TRUE. In a case in which the value of the shared variable "reqHandClose" in the memory 62 has been changed to FALSE as illustrated in FIG. 4, the arithmetic processing part 63 executes the processing after "WHILE reqHandClose DO" of the first source codes 523 illustrated in FIG. 2.

The robot 7 is placed in a factory or the like. The robot 7 acquires a control signal from the controller 6. An arm 70 provided in the robot 7 operates in accordance with the acquired control signal. For example, the arm 70 moves in a predefined range in accordance with the control signal.

The end effector controller 8 is placed in a factory or the like. The end effector controller 8 acquires a control signal from the controller 6. The end effector controller 8 includes a servo amplifier, for example. The end effector controller 8 generates a current in accordance with the control signal and outputs the generated current to the end effector 9.

The end effector 9 is an end effecting machine such as a multi-fingered hand or a screwdriver. The end effector 9 is attached to the tip end of the arm 70. In a case in which the end effector 9 is a multi-fingered hand, the end effector 9 grasps a workpiece in accordance with a current acquired from the end effector controller 8. In the case in which the end effector is the multi-fingered hand, the end effector 9 may release the workpiece in accordance with a current acquired from the end effector controller 8. In a case in which the end effector 9 is a screwdriver, the end effector 9 fastens a screw in accordance with a current acquired from the end effector controller 8.

Next, an operation example of the program development assist system 1 will be described.

Figure 11:
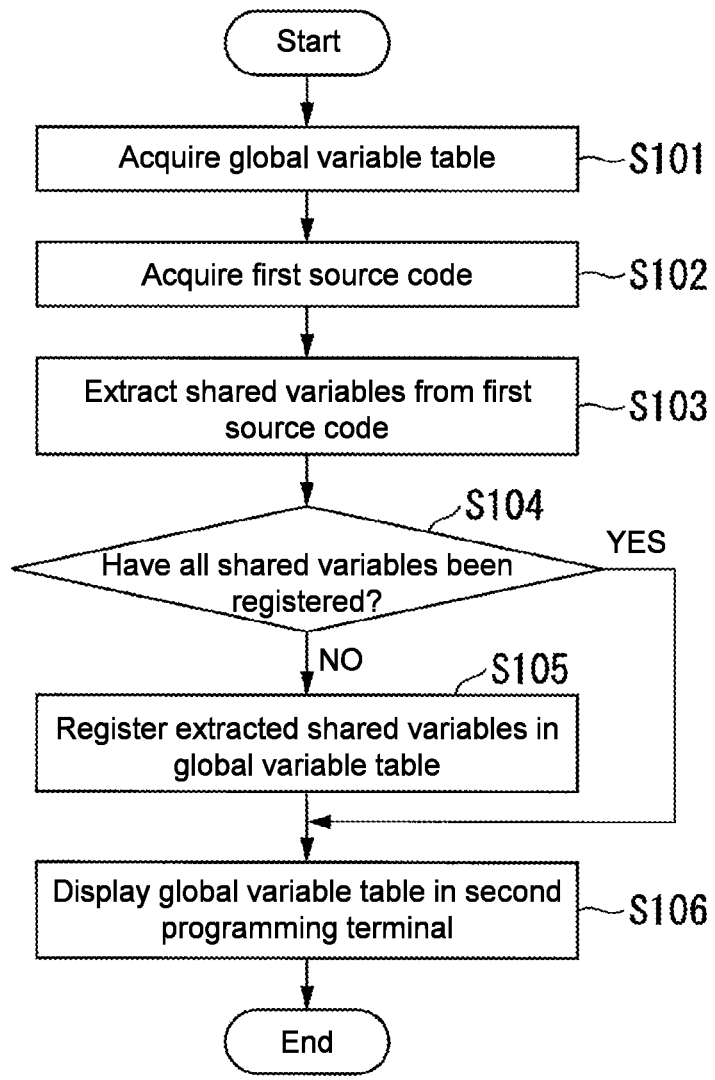
FIG. 11 is a flowchart illustrating an example of a procedure in which a programming development assist apparatus registers shared variables in the global variable table.

FIG. 11 is a flowchart illustrating an example of a procedure in which the programming development assist apparatus 5 registers shared variables in the global variable table 521. The person who develops the first program 520 creates at least one first source code 523 using the first programming terminal 2 while viewing the image of the development environment displayed on the display part 20. The first source code 523 created via the first programming terminal 2 is saved in the programming development assist apparatus 5. The person who develops the first program 520 ends the utilization of the first programming terminal 2. The program recording part 535 records the first program 520 transmitted from the first programming terminal 2 in the storage device 52.

The acquisition part 530 acquires the global variable table 521 illustrated as an example in FIG. 3 from the storage device 52 (Step S101). The acquisition part 530 acquires the first source code 523 (see FIG. 2) of the first program 520 from the storage device 52 (Step S102). The extraction part 531 extracts shared variables such as "reqHandClose" from the first source code 523 (Step S103).

The registration part 532 determines whether or not all the shared variables extracted from the first source code 523 have been registered as shared variables in the global variable table 521 (Step S104). In a case in which all the extracted shared variables have been registered in the global variable table 521 (Step S104: YES), the registration part 532 advances the processing without registering the extracted shared variables in the global variable table 521 again.

In a case in which any of the extracted shared variables has not been registered in the global variable table 521 (Step S104: NO), the registration part 532 registers the unregistered shared variables in the global variable table 521 (Step S105). The person who develops the second program 522 activates the second programming terminal 3. The second programming terminal 3 request the programming development assist apparatus 5 for the global variable table 521, for example. The display control part 533 displays the global variable table 521 requested by the second programming terminal 3 in the second programming terminal 3 as illustrated in at least one of FIGS. 5, 6, and 7, for example (Step S106).

Figure 12:
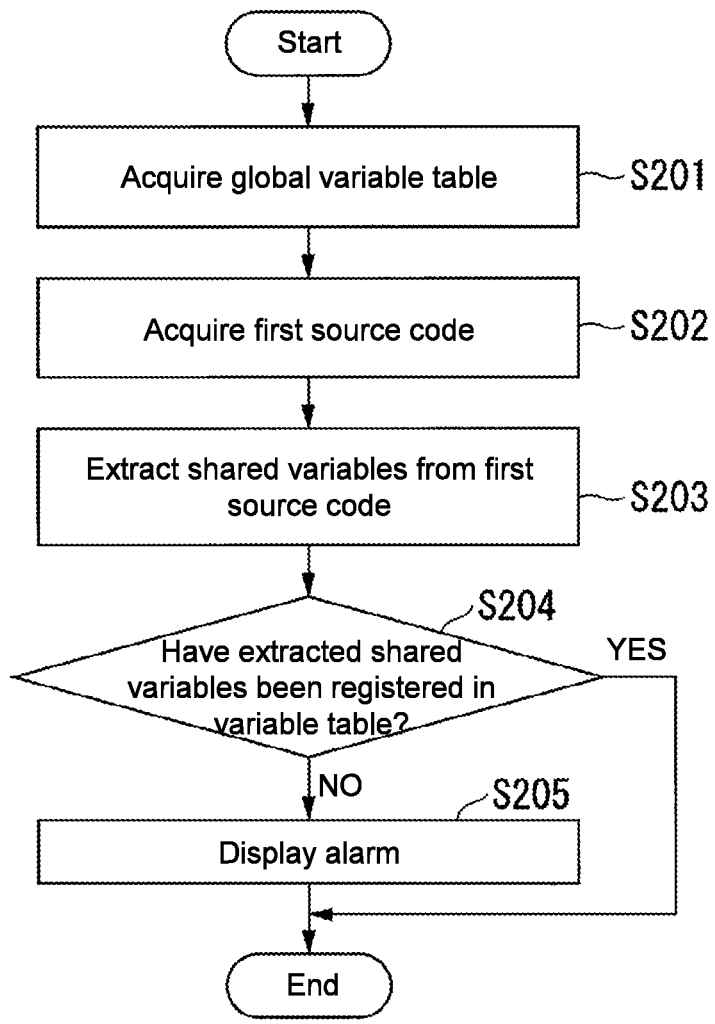
FIG. 12 is a flowchart illustrating an example of a procedure in which the programming development assist apparatus outputs an alarm.

FIG. 12 is a flowchart illustrating an example of a procedure in which the programming development assist apparatus 5 outputs an alarm. The acquisition part 530 acquires the global variable table 521 illustrated as an example in FIG. 3 from the storage device 52 (Step S201). The acquisition part 530 acquires the first source code 523 (see FIG. 2) of the first program 520 from the storage device 52 (Step S202). The extraction part 531 extracts shared variables such as "reqHandClose" from the first source code 523 (Step S203).

The registration part 532 determines whether or not all the shared variables extracted from the first source code 523 have been registered as shared variables in the global variable table 521 (Step S204). In a case in which all the extracted shared variables have been registered in the global variable table 521 (Step S204: YES), the display control part 533 ends the processing without outputting the alarm to the second programming terminal 3.

In a case in which any of the shared variables extracted from the first source code 523 has not been registered in the global variable table 521 (Step S204: NO), the display control part 533 displays an alarm indicating that any of the shared variables of the first source code 523 has not been registered in the global variable table 521 on the first programming terminal 2 and the second programming terminal 3 as illustrated in FIG. 10, for example (Step S205).

Figure 13:
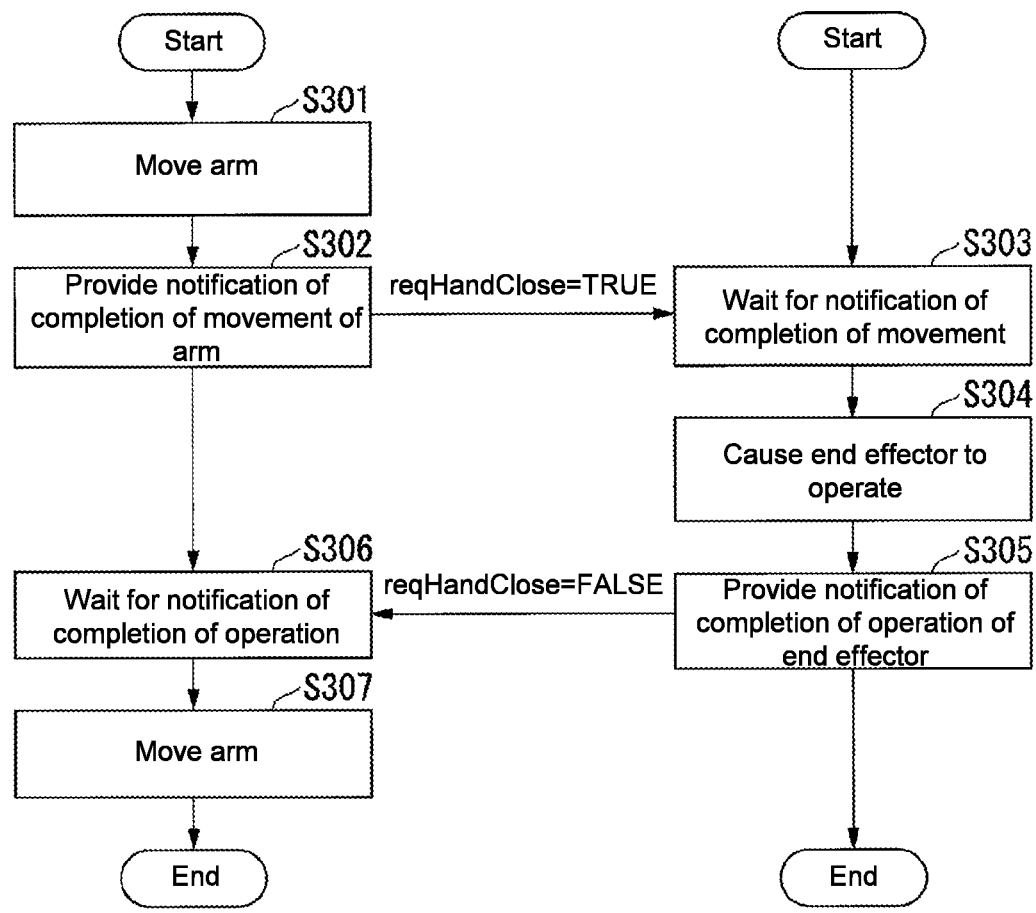
FIG. 13 is a flowchart illustrating an example of synchronous control that a controller executes.

FIG. 13 is a flowchart illustrating an example of synchronous control that the controller 6 executes. The arithmetic processing part 63 executes Step S301, Step S302, Step S306, and Step S307 as task processing of the first source code 523 of the first program 520. The arithmetic processing part 63 executes Steps S303 to S305 as task processing of the execution file of the second program 522.

The arithmetic processing part 63 moves the arm 70 to a predetermined position on the basis of the first source code 523 of the first program 520 developed in the memory 62 from the storage device 61 (Step S301). The arithmetic processing part 63 provides a notification of completion of the movement of the arm 70 to the task of the execution file of the second program 522 by changing the value of the shared variable "reqHandClose" in the memory 62 to TRUE (Step S302).

The arithmetic processing part 63 waits for the notification of the completion of the movement of the arm 70 in the task of the execution file of the second program 522 (Step S303). The arithmetic processing part 63 causes the end effector 9 to operate on the basis of the execution file of the second program 522 developed in the memory 62 from the storage device 61 (Step S304). The arithmetic processing part 63 provides a notification of completion of the operation of the end effector 9 to the task of the first source code 523 of the first program 520 by changing the value of the shared variable "reqHandClose" in the memory 62 to FALSE (Step S305).

The arithmetic processing part 63 waits for the notification of the completion of the operation of the end effector 9 in the task of the first source code 523 of the first program 520 (Step S306). The arithmetic processing part 63 moves the arm 70 to a predetermined position on the basis of the first source code 523 of the first program 520 developed in the memory 62 from the storage device 61 (Step S307).

As described above, the first source code 523 of the first program 520 is described in the first programming language that is an interpreter-type language. The second source code 524 of the second program 522 is described in the second programming language that is a compiler-type language that can refer to the shared variables. The program development assist system 1 is a system that assists with development of the first program 520 and the second program 522 that can refer to the shared variables. The program development assist system 1 includes the extraction part 531 (shared variable extraction part) and the display control part 533 (display control part). The extraction part 531 extracts the shared variables from the first source code 523. The display control part 533 causes the development screen of the second program 522 to display information indicating the extracted shared variables.

In this manner, the program development assist system 1 enables the creator of the second source code described in the second programming language to efficiently recognize the shared variables that have been declared in the first source code that is described in the first programming language.

Although the embodiment of the disclosure has been described above in detail with reference to the drawings, a specific configuration is not limited to the embodiment, and design and the like achieved without departing from the gist of the disclosure are also included.

A part of the processing that the arithmetic processing part 53 executes may be realized using hardware such as an application specific integrated circuit (ASIC). The same applies to the arithmetic processing part 63.

The shared variables may be declared in the second source code 524. In this case, the extraction part 531 extracts the shared variables in the second source code 524. The registration part 532 registers the shared variables extracted from the second source code 524 in the global variable table 521. The shared variables may be declared in both the first source code 523 and the second source code 524. In this case, the extraction part 531 extracts the shared variables from the first source code 523 and the second source code 524. The registration part 532 registers both the shared variables extracted from the first source code 523 and the shared variables extracted from the second source code 524 in the global variable table 521.

Modification Example

The flowchart illustrated in FIG. 11 may be executed in a situation in which the person who develops the first program 520 is continuing to use the first programming terminal 2. That is, the first programming terminal 2 saves the created first source code 523 in the programming development assist apparatus 5. The person who develops the first program 520 continues to use the first programming terminal 2 without ending the utilization of the first programming terminal 2. In this situation, the program recording part 535 records the first program 520 created via the first programming terminal 2 in the storage device 52. Then, the programming development assist apparatus 5 executes operations in and after Step S101.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A program development assist system implemented via a method supported by at least one processor having thereon memory-stored instructions which, when executed by the processor, cause the processor to perform the development assist method, comprising:
   a shared variable extraction part that extracts, from a first source code that is described in a first programming language, shared variables that are variables shared by the first source code and a second source code that is described in a second programming language in a memory; and
   a display control part that causes a development screen of the second source code to display information indicating the shared variables extracted by the shared variable extraction part.

2. The program development assist system according to claim 1, wherein the display control part causes the development screen of the second source code to display the second source code and information indicating the shared variables.

3. The program development assist system according to claim 2, wherein the display control part causes the development screen of the second source code to display the first source code.

4. The program development assist system according to claim 1, further comprising:
   a registration part that registers information indicating the shared variables in a data table,
   wherein the display control part causes the development screen of the second source code to display the data table.

5. The program development assist system according to claim 2, further comprising:
   a registration part that registers information indicating the shared variables in a data table,
   wherein the display control part causes the development screen of the second source code to display the data table.

6. The program development assist system according to claim 3, further comprising:
   a registration part that registers information indicating the shared variables in a data table,
   wherein the display control part causes the development screen of the second source code to display the data table.

7. The program development assist system according to claim 4, wherein the registration part registers information indicating unregistered shared variables in the data table in a case in which information indicating any of the shared variables extracted from the first source code has not been registered in the data table.

8. The program development assist system according to claim 5, wherein the registration part registers information indicating unregistered shared variables in the data table in a case in which information indicating any of the shared variables extracted from the first source code has not been registered in the data table.

9. The program development assist system according to claim 6, wherein the registration part registers information indicating unregistered shared variables in the data table in a case in which information indicating any of the shared variables extracted from the first source code has not been registered in the data table.

10. A program development assist method that is executed by an information processing apparatus, the method comprising:

extracting, from a first source code that is described in a first programming language, shared variables that are variables shared by the first source code and a second source code that is described in a second programming language in a memory; and causing a development screen of the second source code to display information indicating the extracted shared variables.

11. A non-transitory computer readable recording medium storing a program development assist program that causes a computer to execute:

a procedure of extracting, from a first source code that is described in a first programming language, shared variables that are variables shared by the first source code and a second source code that is described in a second programming language in a memory; and a procedure of causing a development screen of the second source code to display information indicating the extracted shared variables.

* * * * *